US006699398B1

(12) United States Patent
Kim

(10) Patent No.: US 6,699,398 B1
(45) Date of Patent: Mar. 2, 2004

(54) EFFECTIVE DRY ETCHING PROCESS OF ACTINIDE OXIDES AND THEIR MIXED OXIDES IN $CF_4/O_2/N_2$ PLASMA

(75) Inventor: Yong-Soo Kim, Seoul (KR)

(73) Assignee: Hanyang Hak Won Co., Ltd., Seoul (KR)

( * ) Notice: Subject to any disclaimer, the term of this patent is extended or adjusted under 35 U.S.C. 154(b) by 0 days.

(21) Appl. No.: 10/018,121

(22) PCT Filed: Jun. 15, 1999

(86) PCT No.: PCT/KR99/00301

§ 371 (c)(1), (2), (4) Date: Apr. 1, 2002

(87) PCT Pub. No.: WO00/77792

PCT Pub. Date: Dec. 21, 2000

(51) Int. Cl.[7] .......................... C04B 41/91; C03C 25/68

(52) U.S. Cl. ............................ 216/55; 216/58; 216/63; 216/67

(58) Field of Search ............................ 216/55, 63, 67, 216/58

(56) References Cited

U.S. PATENT DOCUMENTS 6,171,511 B1 * 1/2001 Charollais et al. ............ 216/55

OTHER PUBLICATIONS

Kim et al., "Dry etching of U and UO2 by flourine containing gas plasma" Proc. Intern. Conf. on Future Nuclear Systems Global '97, p. 1148–1150), Japan (Oct. 5–10, 1997).*

* cited by examiner

*Primary Examiner*—Nadine G. Norton
*Assistant Examiner*—Shamim Ahmed
(74) *Attorney, Agent, or Firm*—Allen, Dyer, Doppelt, Milbrath & Gilchrist, P.A.

(57) ABSTRACT

A process for gas-phase etching of actinide oxides from a substrate by using plasma power comprising the steps of: a) preheating actinide oxides on the substrate within a process chamber filled with fluorine-containing gas and exposing it to plasma power, and subsequently b) etching actinide oxides from the substrate using a plasma gas-phase reactant system.

28 Claims, 4 Drawing Sheets

$UO_2$ etching reaction rate vs. $N_2/CF_4$ mole fraction with the maintenance of the optimum $CF_4/O_2$ ratio at 290℃

$UO_2$ etching reaction rate vs. $O_2$ mole fraction at 290°C (total flow rate: 50sccm, reaction time: 100min)

$UO_2$ etching reaction rate vs. $O_2$ mole fraction at 150W (total flow rate: 50sccm, reaction time: 100min)

$UO_2$ surface morphologies by SEM (a) before reaction (b) 80% $CF_4$-20%$O_2$ (c) 90%$CF_4$-10%$O_2$ (d) 60%$CF_4$-40%$O_2$ plasma reaction $UO_2$ etching reaction rate vs. $N_2/CF_4$ mole fraction with the maintenance of the optimum $CF_4/O_2$ ratio at 290°C

EFFECTIVE DRY ETCHING PROCESS OF ACTINIDE OXIDES AND THEIR MIXED OXIDES IN $CF_4/O_2/N_2$ PLASMA

TECHNICAL FIELD

This invention relates to an effective dry etching process of actinide oxides and their mixed oxides in $CF_4/O_2/N_2$ PLASMA.

BACKGROUND OF THE INVENTION

The fluorination of uranium dioxide has been extensively studied in the application-oriented fields such as uranium separation, processing, and conversion. Along with the applied research, fundamental studies of the $UO_2/F_2$ reaction have been reported by several authors [T. Yahata and M. Iwasaki, *J. Inorg. Nucl. Chem.* 26 (1964) 1863, G. Vandenbussche, CEA-R 2859 (1966), M. Iwasaki, *J. Nucl. Mater.,* 25 (1968) 216, J. C. Batty and R. E. Stickney, *J. Chem. Phys.,* 51 (1969) 4475, B. Weber and A. Cassuto, *Surf. Sci.,* 39 (1973) 83, A. J. Machiels and D. R. Olander, *High Temp. Sci.,* 9 (1977) 3].

The reaction of $UO_2$ at low temperatures of below 800 K under atmospheric pressure of $F_2$ was studied using weight loss measurements by Vandenbussche [G. Vandenbussche, CEA-R 2859 (1966)] and by Iwasaki [M. Iwasaki, *J. Nucl. Mater.,* 25 (1968) 216]. Under these conditions the ultimate reaction products are found to be $UF_6$ and $O_2$, while a variety of intermediate reaction products such as $(UO_2)_4F$ and $UO_2F_2$ are identified. On the contrary, a quasi-equilibrium reaction modelling study predicted that at high temperatures of above 1000K under low pressure of $F_2$ ($10^{-7}$~$10^{-4}$ Torr), uranium hexa- and penta-fluoride formations are suppressed in favor of $UF_4$ and atomic fluorine formation [J. C. Batty and R. E. Stickney, *J. Chem. Phys.,* 51 (1969) 447, and B. Weber and A. Cassuto, *Surf. Sci.,* 39 (1973) 83].

A kinetic study carried out later at high temperatures of above 1,000 K under ultra-high vacuum condition confirmed that the reaction product is $UF_4$ and the reaction probability is about $10^{-2}$ [A. J. Machiels and D. R. Olander, *High Temp. Sci,.* 9 (1977) 3]. The authors claimed that the reaction mechanism is a second-order surface reaction coupled with the double-diffusion process. The disagreement between these early experimental results seems to stem from the different ranges of temperatures and pressures.

Recently the feasibility of burning spent PWR fuel in a CANDU reactor was carried out, in which decladding of spent fuel pins and dry-processing of burned uranium dioxide such as OREOX (Oxidation and Reduction of Oxide fuel) process are the main processes to make re-sinterable fuel powder [H. Keil. P. Boczar. and H. S. Park, *Proc. Intern. Conf. Tech. Expo. on Future Nuclear Systems, Global* '93. Seattle, Wash., USA [Sep. 12–17, 1993) 733 and M. S. Yang. Y. W. Lee. K. K. Bae. and S. H. Na. *Proc. Intern. Conf. Tech. Expo., on Future Nuclear Systems, Global* '93. Seattle, Wash. USA (Sep. 12–17, 1993) 740]. In the process, however, most candidate decladding techniques were unable to recover more than 98 to 99.5% of the heavy metal/metal oxide. A part of the remainder will be present as adherent dust and some may also be chemically bonded to the zirconium oxide layer on the inside of the fuel pin. Therefore, another process for additional removal of the last portion of the fuel is required, which also removes alpha contamination from the clad to a level qualifying the fuel hulls as non-TRU. For the secondary decontamination process, a plasma processing technique using fluorine-containing gas plasma was proposed and its applicability has been demonstrated [Y. Kim. J. Min, K. Bae, M. Yang, J. Lee. and H. Park, *Proc. Intern. Conf. on Future Nuclear Systems, Global* '97. Yokohama, Japan (Oct. 5–10, 1997) 1148]. Since then, dry etching treatments of TRU oxide including uranium dioxide have been extensively focused.

Following the demonstration, as a representative compound of actinide oxides including TRU dioxides, the effective etching reaction process of uranium dioxide in $CF_4/O_2/N_2$ plasma and reaction mechanisms have been investigated in detail in this work.

SUMMARY OF THE INVENTION

It is invented that the fluorination etching reaction of actinide oxides such as $UO_2$, $ThO_2$, and $PuO_2$ in $CF_4/O_2$ gas plasma is enhanced when small amount of $N_2$ gas is added or mixed at the temperature of ambience up to 600° C. under the low pressure of 1 m Torr up to 1 atm. As a representing actinide, oxide uranium dioxide was chosen and its reaction rates were investigated as functions of $CF_4/O_2/N_2$ ratio, plasma power, substrate temperature, and exposure time to the plasma. From the current investigation, it is found that there exists an optimum $CF_4/O_2$ ratio for the effective etching in $CF_4/O_2/N_2$ plasma. The ratio of $CF_4$ to $O_2$ is around four, regardless of plasma power, substrate temperature, and gas volume flow rate. When the small amount of $N_2$ gas ranging from 1% to 20% of $CF_4$ gas based on the gas volume is added to or mixed with the optimized $CF_4/O_2$ the etching rate is enhanced remarkably over 4 up to 5 times compared to that of $CF_4/O_2$ plasma without $N_2$ gas.

This optimum etching process must be applicable to the dry etching of other actinide oxides including TRU (TRans-Uranium) oxides and their mixed oxides since all actinide elements have very similar chemical characteristics with uranium and, thus, form similar types of oxides.

In current examination, r.f. and microwave power gas plasma generation techniques were used with the power ranging 50 W up to 2 kW and the effectiveness of this process was confirmed. Since basic principle of gas plasma generation techniques is identical except different working pressure ranges, this effective etching rate must be increasing with increasing plasma power up to 100 kW extractable from various gas plasma generation techniques such as dc (direct current), ac (alternating current), and ecr (electron cyclotron resonance) plasma.

Also the effectiveness of this process was successfully demonstrated in the etching experiments of uranium oxide on the zirconium alloys, stainless steels, or inconels (Ni based alloys) substrates.

BRIEF DESCRIPTION OF THE DRAWINGS

These figures are described in the Examples described in the following section.

DETAILED DESCRIPTION OF THE INVENTION

This invention is for the effective etching or removal, i.e., decontamination of radioactive residual materials of fresh/ spent nuclear fuel on the substrate surface of claddings, tubes, and containers in the various systems in the nuclear facilities such as nuclear power plants, nuclear fuel factories, spent fuel dry processing laboratories, and nuclear hot cells.

Actinide elements such as thorium, uranium, and plutonium are called fluorine-hungry atoms (which means that chemical reactivity is extremely strong) and lots of fluorine atoms or molecules can be discharged in the fluorine-containing gas plasma. Based on these facts, an effective dry etching process of actinide oxides including $UO_2$ and TRU oxide in $CF_4/O_2/N_2$ plasma has been determined in this work.

From the elementary reaction point of view, the molecular and/or atomic fluorine produced in the plasma or dissociated from the intermediate species are believed to take part in the fluorination reaction. In fact, $CF_4/O_2$ is one of the most popular gas mixtures used for fluorination of solids in the various industries [I. C. Plumb and K. R. Ryan, *Plasma Chemistry and Plasma Processing,* 6 (1986) 205, and D. L. Flamm, V. M. Donnelly, and J. A. Mucha. *J. Appl. Phys,*. 52 (1981) 3633]. Thus, as a result of its popularity, a number of studies on the gas phase reaction of the mixture gas plasma have been carried out [I. C. Plumb and K. R. Ryan, *Plasma Chemistry and Plasma Processing,* 6 (1986) 205, D. L. Flamm. V. M. Donnelly, and J. A. Mucha. *J. Appl. Phys,*. 52 (1981) 3633, J. C. Martz. D. W. Hess. J. M. Haschke, J. W. Ward, and B. F. Flamn, *J. Nucl. Mater.,* 182 (1991) 277, and Y. Kim, J. Min, K. Bae, and M. Yani, *J. Nucl. Mater.,* 270 (1999) 253].

In the current investigation, uranium dioxide was chosen as a representing actinide and its reaction rates were investigated as functions of $CF_4/O_2/N_2$ ratio, plasma power, substrate temperature, and exposure time to the plasma. Under plasma power up to 2 kW, etching reactions were examined with various $CF_4/O_2$ ratios for 100 minutes at several substrate temperatures of up to 600° C.

It is found that there exists an optimum $CF_4/O_2$ ratio for the effective etching in $CF_4/O_2/N_2$ plasma. The ratio of $CF_4$ to $O_2$ is around four, regardless of plasma power, substrate temperature, and gas volume flow rate.

EXAMPLE 1

Figure 1:
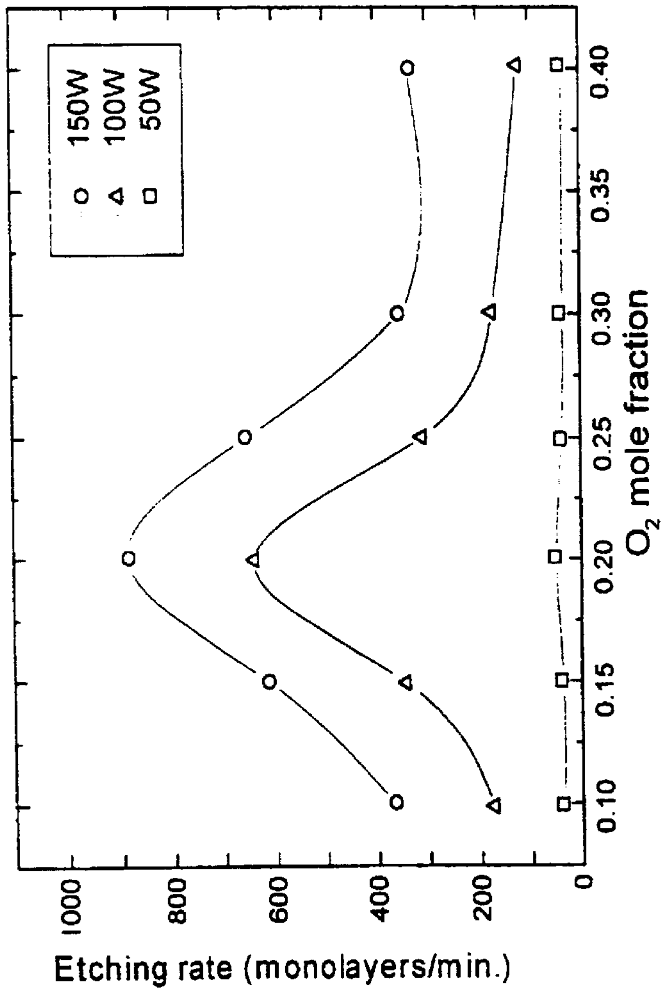
FIG. 1 is $UO_2$ surface morphology changes by SEM with (a) no reaction, (b) $80\%CF_4$–$20\%O_2$, (c) $90\%CF_4$–$10\%O_2$, and (d) $60\%CF_4$–$40\%O_2$ plasma reaction.
Figure 2:
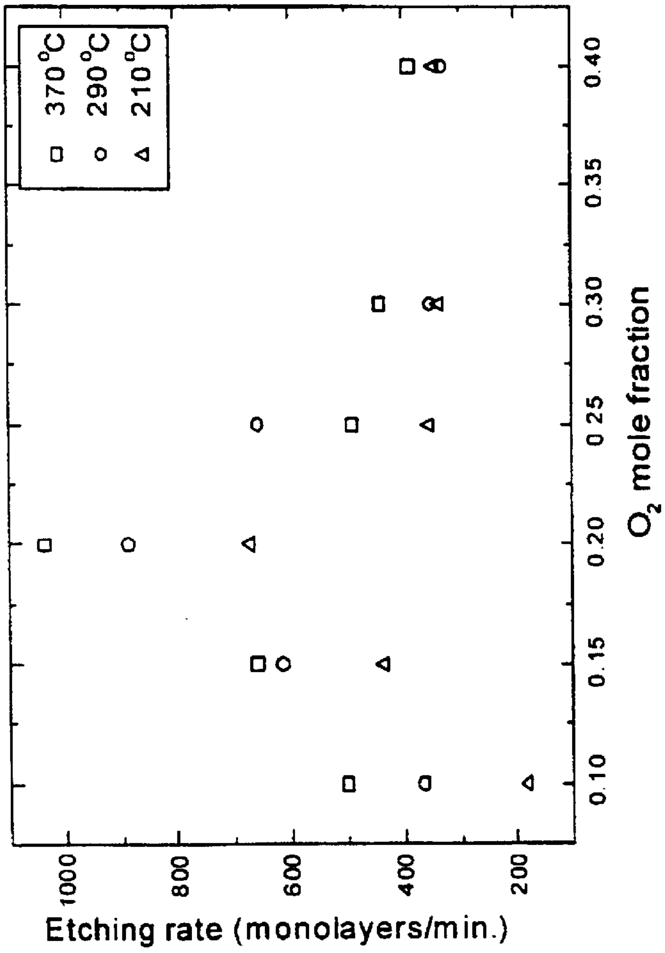
FIG. 2 is $UO_2$ etching reaction rate vs. $O_2$ mole fraction at 290° C. (total flow rate: 50 sccm, reaction time: 100 min.)
Figure 3:
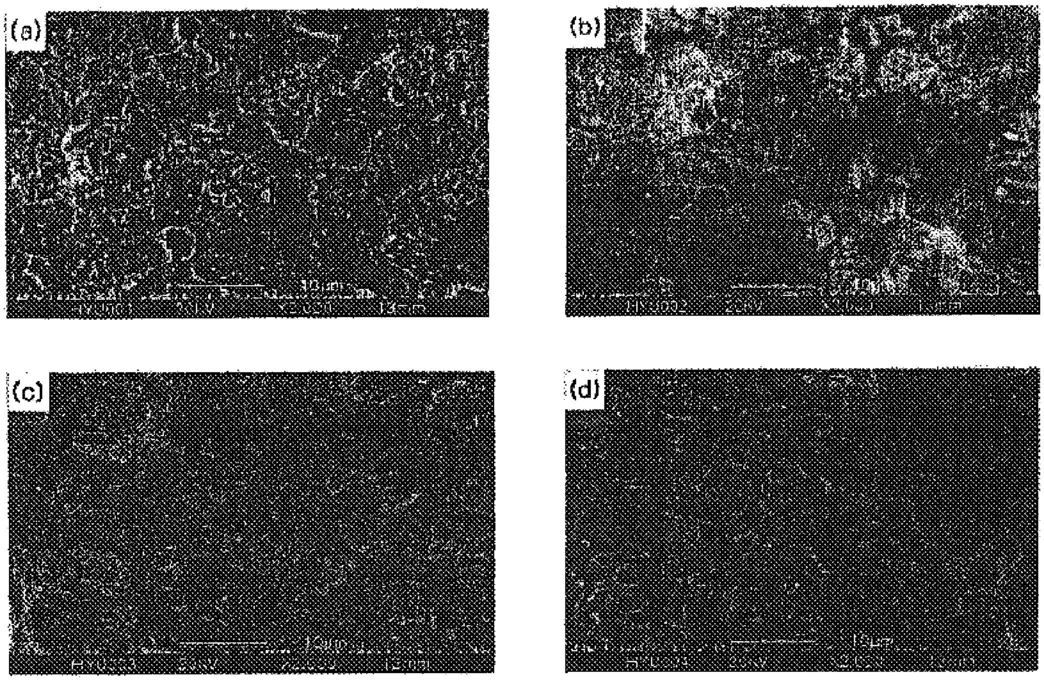
FIG. 3 is $UO_2$ etching reaction rate vs. $O_2$ mole fraction at 150 W (total flow rate: 50 sccm, reaction time: 100 min.

As an example of the findings, the experimental results are plotted in FIGS. 1 to 3. FIGS. 1 and 2 reveal that the optimum $CF_4/O_2$ ratio for the efficient etching of $UO_2$ is around 4, regardless of plasma power and substrate temperature. In FIG. 3, $UO_2$ surface morphology changes by SEM is shown as $CF_4/O_2$ ratio varies. The best-etched surface morphology is seen in FIG. 3(*b*), which demonstrates that the etching rate is maximized at about $CF_4/O_2=4$.

The existence of the optimum gas composition is supported by additional surface analysis using SEM, XPS and XRD. This optimum gas composition is explained by the following experimental findings: at oxygen gas composition of lower than the optimum, the amount of oxygen is not enough to pick up the carbon residuals, hence, the carbon residuals decomposed from $CF_4$ may deposit on the surface and suppress surface reaction, on the other hand, at higher oxygen gas composition, high reactivity of excessive oxygen with surface uranium atoms may form hyper-stoichiometric uranium oxides instead of carbon mono- or di-oxide and thus interfere with the formation of volatile uranium fluorides.

XPS analysis also confirms that $UO_2F_2$ compound forms as a precusor intermediate on the surface during the reaction and additional experiments show that reaction kinetics follows a linear rate law.

EXAMPLE 2

Figure 4:
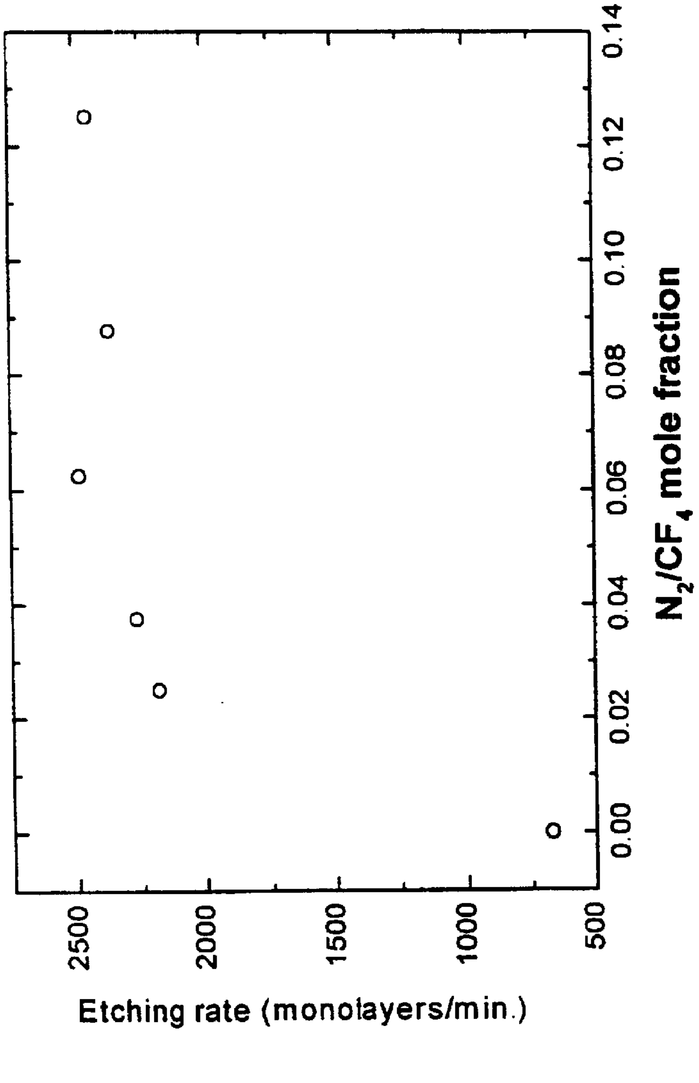
FIG. 4 is $UO_2$ etching reaction rate vs. $N_2/CF_4$ mole fraction with the maintenance of the optimum $CF_4/O_2$ ratio at 290° C.

When the small amount of $N_2$ gas, ranging from 1% to 20% of $CF_4$ gas based on the gas volume, is added to or mixed with the optimized $CF_4/O_2$ gas mixture plasma the $UO_2$ etching reaction rate remarkably is enhanced. Experimental result in FIG. 4 is an example of the enhancement of the etching rate. More specifically, under these conditions, the etching rate at 290° C. is improved over 4 up to 5 times compared to that of optimum $CF_4/O_2$ plasma without nitrogen whose etching reaction rate is about 670 monolayers/min., (equivalent to 0.27 μm/min.). Therefore, in this case, the accelerated etching reaction rate at the same temperature under same power exceeds 2500 monolayer/min., equivalent to 1.0 μm/min.

According to mass spectrometric analysis, it is determined that the major reaction product is uranium hexafluoride, $UF_6$. Therefore, based on the experimental findings the dominant overall reaction of uranium dioxide in $CF_4/O_2/N_2$ plasma is determined:

$$UO_2+\tfrac{3}{2}CF_4+\tfrac{3}{8}O_2=UF_6+\tfrac{3}{2}CO_{2-x}$$

where $CO_{2-x}$ represents the undetermined mix of $CO_2$ and CO.

It seems that the added nitrogen plays only a catalytic role in the overall surface reaction between uranium atoms and fluorine atoms or unstable fluorine-atom-containing species without changing the reaction paths or mechanisms.

This optimum etching process must be applicable to the dry etching of other actinide oxides including TRU (TRans-Uranium) oxides and their mixed oxides since all actinide elements have very similar chemical characteristics with uranium and, thus, form very similar types of oxides.

In current examination, r.f. and microwave power gas plasma generation techniques were used with the power ranging 50 W up to 2 kW and the effectiveness of this process was confirmed. Since basic principle of gas plasma generation techniques is identical except different working pressure ranges, this effective etching rate must be increasing with increasing plasma power up to 100 kW extractable from various gas plasma generation techniques such as dc (direct current), ac (alternating current), and ecr (electron cyclotron resonance) plasma.

Also the effectiveness of this process was successfully demonstrated in the etching experiments of uranium oxide on the zirconium alloys, stainless steels, or inconels (Ni based alloys) substrates.

By applying this effective dry-etching process, the decontamination of radioactive residual materials of fresh/spent nuclear fuel on the substrate surface of claddings, tubes, or containers in the various systems can be effectively, remotely, and safely performed without introducing wet-processing in the nuclear facilities in which contaminations can take place by the residuals of fresh or spent nuclear fuel.

What is claimed is:

1. A process for gas-phase etching of actinide oxides from a substrate using plasma power and comprising:

a) preheating actinide oxides on the substrate within a process chamber including fluorine-containing gas and exposing it to plasma power, and subsequently b) etching actinide oxides from the substrate using said fluorine-containing plasma gas.

2. The process of claim 1 wherein the actinide oxides comprises at least one of $ThO_2$, $PaO_2$, $UO_2$, $NpO_2$, $PuO_2$, $AmO_2$, $CmO_2$, $BkO_2$, $CfO_2$, and their mixed oxides.

3. The process of claim 1 wherein the substrate comprises at least one of zirconium alloys, stainless steels, and inconels (Ni based alloys).

4. The process of claim 1 wherein, in step a), the fluorine-containing gas comprises a mixture of carbon tetra-fluoride, oxygen, and nitrogen and the volume ratio of oxygen to carbon tetra-fluoride is from about 15:85 to about 25:75.

5. The process of claim 4 wherein the fluorine-containing gas comprises a mixture with 1% up to 20% $N_2$ of $CF_4$ gas based on a gas volume in the process chamber.

6. The process of claim 1 wherein, in step a), the plasma power comprises at least one of r.f. (radio frequency), dc (direct current), ac (alternating current), micro-wave, and ecr (electron cyclotron resonance) plasma power.

7. The process of claim 1 wherein, in step a), the plasma power is from about 50 W to 100 kW.

8. The process of claim 1 wherein, in step b), the plasma gas-phase reactant system further comprises a catalyst.

9. The process of claim 1 wherein, in step b), the substrate temperature is from about ambient temperature up to about 600° C.

10. The process of claim 1 wherein, in step b), a pressure in the process chamber during plasma gas-phase etching is from about 1 mTorr up to about 1 atm.

11. The process of claim 1 wherein, in step a), at least some of the constituent gases in the fluorine-containing gas are provided separately to the process chamber in separate gas supply lines.

12. The process of claim 11 wherein the constituent gases in the fluorine-containing comprise carbon tetra-fluoride, oxygen and nitrogen; and wherein the constituent gases are provided separately by respective supply lines controlled by respective mass flow controllers with flow rates ranging from 10 sccm to 1000 sccm.

13. The process of claim 1 wherein, in step a), the constituent gases in the fluorine-containing gas are supplied to the process chamber as an admixture of carbon tetra-fluoride, oxygen and nitrogen in a flowing gas regime with a total gas flow rate from 10 sccm to about 1000 sccm.

14. The process of claim 1 wherein the substrate comprises a nuclear facility device.

15. The process of claim 14 wherein the nuclear facility device comprises at least one of a nuclear facility cladding, tube and container.

16. A process for gas-phase etching of trans-uranium (TRU) oxides from a nuclear facility device using plasma power and comprising:

a) preheating the TRU oxides on the nuclear facility device within a process chamber including fluorine-containing gas and exposing it to plasma power, and subsequently b) etching the TRU oxides from the nuclear facility device using said fluorine-containing plasma gas.

17. The process of claim 16 wherein the nuclear facility equipment substrate comprises at least one of zirconium alloys, stainless steels, and inconels (Ni based alloys).

18. The process of claim 16 wherein, in step a), the fluorine-containing gas comprises a mixture of carbon tetra-fluoride, oxygen, and nitrogen and the volume ratio of oxygen to carbon tetra-fluoride is from about 15:85 to about 25:75.

19. The process of claim 16 wherein the fluorine-containing gas comprises a mixture with 1% up to 20% $N_2$ of $CF_4$ gas based on a gas volume in the process chamber.

20. The process of claim 16 wherein, in step a), the plasma power comprises at least one of r.f. (radio frequency), dc (direct current), ac (alternating current), micro-wave, and ecr (electron cyclotron resonance) plasma power.

21. The process of claim 16 where in step a), the plasma power is from about 50 W to 100 kW.

22. The process of claim 16 wherein, in step b), the plasma gas-phase reactant system further comprises a catalyst.

23. The process of claim 16 wherein, in step b), the substrate temperature is from about ambient temperature up to about 600° C.

24. The process of claim 16 wherein, in step b), a pressure in the process chamber during plasma gas-phase etching is from about 1 mTorr up to about 1 atm.

25. The process of claim 16 wherein, in step a), at least some of the constituent gases in the fluorine-containing gas are provided separately to the process chamber in separate gas supply lines.

26. The process of claim 25 wherein the constituent gases in the fluorine-containing comprise carbon tetra-fluoride, oxygen and nitrogen; and wherein the carbon tetra-fluoride, oxygen and nitrogen gases are provided separately by respective supply lines controlled by respective mass flow controllers with flow rates ranging from 10 sccm to 1000 sccm.

27. The process of claim 16 wherein, in step a), the constituent gases in the fluorine-containing gas are supplied to the process chamber as an admixture of carbon tetra-fluoride, oxygen and nitrogen in a flowing gas regime with a total gas flow rate from 10 sccm to about 1000 sccm.

28. The process of claim 16 wherein the nuclear facility device comprises at least one of a nuclear facility cladding, tube and container.

* * * * *